(12) United States Patent
Margomenos et al.

(10) Patent No.: US 7,797,817 B2
(45) Date of Patent: Sep. 21, 2010

(54) MICROWAVE COMPONENT AND METHOD FOR MAKING THE SAME

(75) Inventors: Alexandros Margomenos, Ann Arbor, MI (US); Serdar H. Yonak, Ann Arbor, MI (US); Koji Shiozaki, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 75 days.

(21) Appl. No.: 12/212,733

(22) Filed: Sep. 18, 2008

(65) Prior Publication Data

US 2010/0066638 A1 Mar. 18, 2010

(51) Int. Cl.
*H01Q 13/00* (2006.01)
*H05K 1/16* (2006.01)

(52) U.S. Cl. .......................... 29/600; 361/749
(58) Field of Classification Search ............. 29/600; 361/749
See application file for complete search history.

(56) References Cited

U.S. PATENT DOCUMENTS 7,149,095 B2 12/2006 Warner et al.
7,275,937 B2 10/2007 Ellison
7,356,917 B2 4/2008 Harada et al.
2007/0013052 A1 1/2007 Zhe et al.
2007/0280528 A1 12/2007 Wellington et al.

OTHER PUBLICATIONS

Justice et al., Electric-Coupled Metamaterials for Microwave Beam Formation. 2007 IEEE, pp. 2566-2569.
Yang et al., Integration of Sensors and Inkjet-Printed RFID Tags on Paper-based Substrates for UHF "Cognitive Intelligence" Application, 2007 IEEE, pp. 1193-1196.
Katsumi Takata, Manufacturing of Liquid Crystal Polymer Flex and its Characteristics. Nippon Steel Chemical Co., Ltd., Jun. 2007, Honolulu.

*Primary Examiner*—Evan Pert
(74) *Attorney, Agent, or Firm*—Gifford, Krass, Sprinkle, Anderson & Citkowski, P.C.

(57) ABSTRACT

A microwave component having an elongated flexible sheet made of a liquid crystal polymer. A first microwave pattern is printed on one side of the sheet while a second microwave pattern is printed on the other side of the sheet. The first and second patterns are mirror images of each other so that, with the first and second portions of the sheet folded over so that the first portion overlies the second portion, the patterns are aligned with each other and bond together. A margin area of the sheet in between the first and second patterns is then removed to form the microwave component.

16 Claims, 2 Drawing Sheets

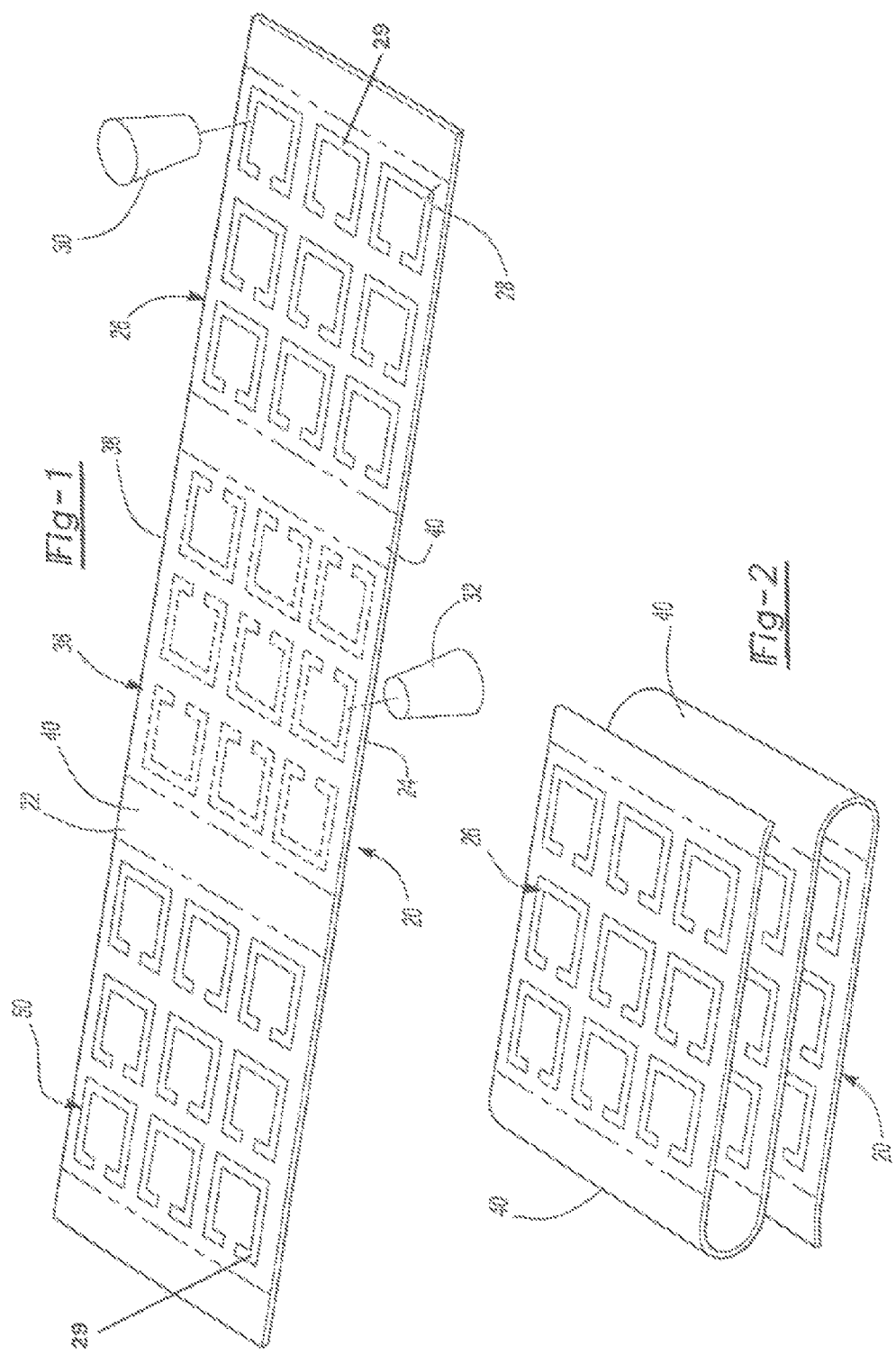

MICROWAVE COMPONENT AND METHOD FOR MAKING THE SAME

BACKGROUND OF THE INVENTION

I. Field of the Invention

The present invention relates to microwave components such as microwave lenses.

II. Description of Material Art

The field of metamaterials continues to grow in popularity. Such metamaterials exhibit properties in response to electromagnetic radiation in the microwave or millimeter (mm) range which depends upon the structure of the metamaterials, rather than their composition.

One disadvantage of constructing microwave components, such as lenses, from metamaterials is that the fabrication of the microwave component is relatively difficult and expensive. This, in turn, increases the overall cost of the microwave system.

SUMMARY OF THE PRESENT INVENTION

The present invention provides a microwave component, such as a microwave lens, made of a metamaterial which overcomes the above-mentioned disadvantages of the previously known devices.

In brief, the microwave component of the present invention comprises an elongated flexible sheet made of a liquid crystal polymer. Such a sheet is transparent to microwave electromagnetic radiation.

A first component pattern is printed on a first portion of the flexible sheet using conventional ink jet printing techniques. The first pattern is made of a conductive material, such as silver-based ink, and the resulting pattern comprises a plurality of electronic inductive capacitive resonators, each of which has a resonant frequency dependent upon the design of the pattern. A plurality of such resonators are formed within the pattern so that each resonator is spaced apart from the others.

A second component pattern is formed on a second portion of the flexible sheet which is spaced from the first portion of the sheet by a margin portion. This second component pattern is a mirror image of the first component pattern and is also formed on the sheet by utilizing ink jet techniques. Furthermore, the first and second component patterns are formed on opposite sides of the flexible sheet.

The flexible sheet is then folded so that the first component pattern overlies and is aligned with the second component pattern. Thereafter, the first and second portions of the sheet are bonded together, e.g. by heat bonding. Following the bonding of the first and second portions of the flexible sheet, the margin portion of the sheet is removed in any conventional fashion, such as by cutting, thus forming the microwave component.

In order to form a multilayer microwave component having more than two layers, alternating first and second patterns on the opposite sides of the flexible sheet may be printed and then the sheet folded so that the first and second patterns all align with each other to form the microwave component, such as a lens.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 1 is an elevational diagrammatic view illustrating a first step of the present invention;

FIG. 2 is an elevational view illustrating a second step of the present invention;

DETAILED DESCRIPTION OF A PREFERRED EMBODIMENT OF THE PRESENT INVENTION

Figure 3:
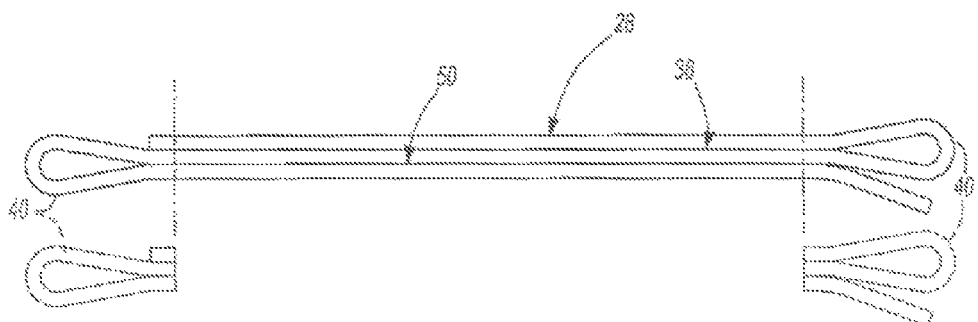
FIG. 3 is a side view illustrating a further step of the present invention.

With reference first to FIG. 1, a preferred embodiment of the present invention is shown and comprises an elongated flexible liquid crystal polymer sheet 20 having a top side 22 and a bottom side 24. Such sheets of liquid crystal polymer are available from commercial sources such as Rogers, Inc. and Nippon Steel Chemical Limited. Such liquid crystal polymer sheets, furthermore, are essentially transparent to electromagnetic radiation in the millimeter wavelength range.

A first component pattern 26 is formed on a first portion 28 of the sheet 20. This first pattern 26, furthermore, is illustrated in FIG. 1 as a plurality of electronic inductive capacitive resonators 29, each of which has its own resonant frequency dependent upon the shape of the individual resonator. Typically, a plurality of resonators are formed on the first portion 28 of the sheet 20 and the resonators 29 are spaced apart from each other.

Preferably, an ink jet printer 30 is utilized to form the component pattern 26 on the top surface 22 of the portion 28 of the sheet 20. The ink utilized by the printer 30 is a metal-based ink, such as a silver-based ink.

Still referring to FIG. 1, a second printer 32 prints a second component pattern 36 on a second portion 38 of the sheet 20. The second portion 38 of the sheet 20 is adjacent to, but spaced from, the first portion 28 by a margin portion 40.

The second component pattern 36 is a mirror image of the first component pattern 26 and, like the first pattern 26, is made from a metal-based ink, such as a silver-based ink. Unglue the first component pattern 26, however, the second component pattern 36 is printed on the opposite side 24 of the sheet 20 than the first component pattern 26.

Still referring to FIG. 1, a further component pattern 50 substantially identical to the first component pattern 26 may then be printed on the top side 22 of the sheet 20 adjacent the second portion 38 of the sheet and separated from the second pattern 36 by another margin portion 40. Furthermore, although only three component patterns are illustrated in FIG. 1, it will be understood that numerous component patterns may be printed on the elongated flexible sheet 20 by printing alternating mirror images sequentially along the sheet and on opposite sides of the sheet.

Although the component patterns 26, 36 and 50 are preferably formed by utilizing ink jet printers, it will be understood that other means may be utilized to form the component patterns 26, 36 and 50. For example, such patterns may be formed by copper lamination, milling and chemical etching without deviation from the spirit or scope of the invention.

With reference now to FIG. 2, after the component patterns have been formed along the flexible sheet, the flexible sheet is folded so that the adjacent component patterns overlie each other and are aligned with each other. In doing so, each component pattern 26, 36 and 50 is separated from each other by the thickness of the liquid crystal polymer sheet 20. As shown in FIG. 3, the first and second portions 28 and 38 of the sheet are then bonded together by any conventional means, such as a heat bonder which fuses the sheets together.

Figure 4:
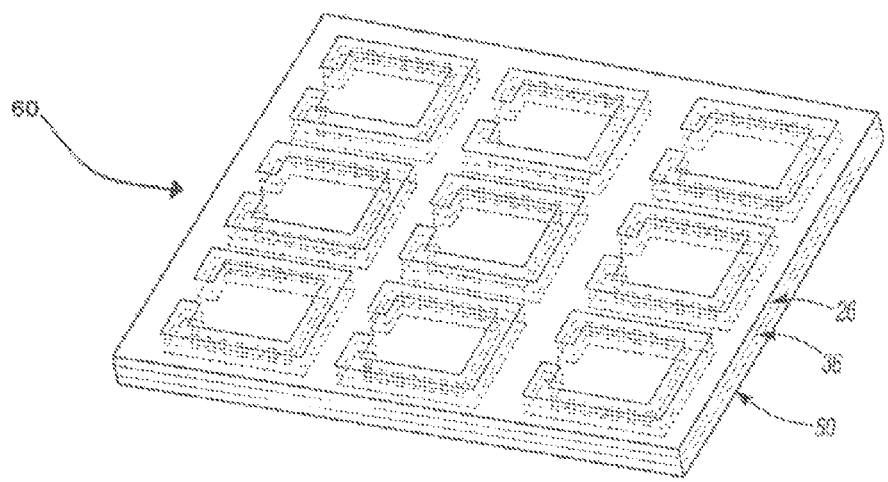
FIG. 4 is an elevational view of a microwave component in accordance with the present invention.

After the first and second portions of the sheet 20 are bonded together so that the first and second component patterns 26 and 36 are aligned with each other as desired, the margin portions 40 of the flexible sheet 20 are removed by simply cutting the margin portions away and forming the resulting microwave component 60 as shown in FIG. 4.

From the foregoing, it can be seen that the present invention provides a simple and yet highly effective microwave component, such as a microwave lens, which is not only simple to fabricate, but inexpensive in construction. Having described our invention, however, many modifications thereto will become apparent to those skilled in the art to which it pertains without deviation from the spirit of the invention as defined by the scope of the appended claims.

We claim:

1. A method for constructing a microwave component comprising the steps of:
    forming a first component pattern on a first portion of a flexible sheet,
    forming a second component pattern on a second portion of said flexible sheet, said second component pattern being a mirror image of said first component pattern, said first and second portions of said flexible sheet being adjacent to and spaced from each other, said first and second component patterns being formed on opposite sides of said flexible sheet,
    folding said flexible sheet so that said first component pattern overlies and is aligned with said second component pattern,
    thereafter bonding said first and second portions of said sheet together.

2. The method as defined in claim 1 wherein each said forming step comprises the step of printing said pattern on said flexible sheet.

3. The method as defined in claim 1 wherein each said forming step comprises the step of inkjet printing said pattern on said flexible sheet.

4. The method as defined in claim 1 wherein said bonding step comprises the step of heat bonding said first and second portions of said sheet together.

5. The method as defined in claim 1 wherein said flexible sheet comprises a liquid crystal polymer.

6. The method as defined in claim 1 wherein said microwave component comprises a metamaterial lens.

7. The method as defined in claim 1 wherein said flexible sheet includes a margin portion between said first and second portions and comprising the step of removing said margin following said bonding step.

8. The method as defined in claim 1 wherein each pattern comprises a metallic material.

9. A microwave component comprising:
    a flexible sheet,
    a first component pattern on a first portion of said flexible sheet,
    a second component pattern on a second portion of said flexible sheet, said second component pattern being a mirror image of said first component pattern, said first and second portions of said flexible sheet being adjacent to and spaced from each other, said first and second component patterns being formed on opposite sides of said flexible sheet by, folding said flexible sheet so that said first component pattern overlies and is aligned with said second component pattern,
    wherein bonding said first and second portions of said sheet are bonded together.

10. The microwave component as defined in claim 9 wherein component pattern is formed by a step of printing said pattern on said flexible sheet.

11. The microwave component as defined in claim 9 wherein component pattern is formed by a step of ink jet printing said pattern on said flexible sheet.

12. The microwave component as defined in claim 9 wherein said bonded portions are formed using a step of heat bonding said first and second portions of said sheet together.

13. The microwave component as defined in claim 9 wherein said flexible sheet comprises a liquid crystal polymer.

14. The microwave component as defined in claim 9 wherein said microwave component comprises a metamaterial lens.

15. The microwave component as defined in claim 9 wherein said flexible sheet includes a margin portion between said first and second portions and comprising the step of removing said margin following said bonding step.

16. The microwave component as defined in claim 9 wherein each pattern comprises a metallic material.

* * * * *